US009646655B2

United States Patent
Carter et al.

(10) Patent No.: US 9,646,655 B2
(45) Date of Patent: May 9, 2017

(54) SYSTEMS AND METHODS FOR INTERACTION-BASED ANALYSIS AND VISUALIZATION OF REMOTE COLLABORATION SESSIONS

(71) Applicant: FUJI XEROX CO., LTD., Tokyo (JP)

(72) Inventors: Scott Carter, Mountain View, CA (US); Matthew L Cooper, San Francisco, CA (US); Laurent Denoue, Veneto (IT)

(73) Assignee: FUJI XEROX CO., LTD., Tokyo (JP)

( * ) Notice: Subject to any disclaimer, the term of this patent is extended or adjusted under 35 U.S.C. 154(b) by 72 days.

(21) Appl. No.: 14/841,467

(22) Filed: Aug. 31, 2015

(65) Prior Publication Data
US 2017/0062013 A1    Mar. 2, 2017

(51) Int. Cl.
G11B 27/34 (2006.01)
G06F 3/0481 (2013.01)
G11B 27/031 (2006.01)
G06F 3/14 (2006.01)

(52) U.S. Cl.
CPC .......... *G11B 27/34* (2013.01); *G06F 3/04812* (2013.01); *G06F 3/1454* (2013.01); *G11B 27/031* (2013.01)

(58) Field of Classification Search
CPC ... G11B 27/34; G11B 27/031; G06F 3/04812; G06F 3/1454
USPC .......................................................... 386/241
See application file for complete search history.

(56) References Cited

U.S. PATENT DOCUMENTS

| 9,307,269 | B2* | 4/2016 | Martin | H04N 21/23418 |
| 9,405,824 | B2* | 8/2016 | Kritt | G06F 17/30707 |
| 2015/0169170 | A1* | 6/2015 | Beach | G06F 3/04812 715/856 |

OTHER PUBLICATIONS

Adcock, M. Cooper, L. Denoue, H. Pirsiavash, and L. A. Rowe. Talkminer: A lecture webcast search engine. In Proceedings of the International Conference on Multimedia, MM '10, pp. 241-250, New York, NY, USA, 2010. ACM.

Denoue, S. Carter, and M. Cooper. Content-based copy and paste from video documents. In Proceedings of the 2013 ACM Symposium on Document Engineering, DocEng '13, pp. 215-218, New York, NY, USA, 2013. ACM.

Hill, J. D. Hollan, D. Wroblewski, and T. McCandless. Edit wear and read wear. In Proceedings of the SIGCHI Conference on Human Factors in Comlputing Systems, CHI '92, pp. 3-9, New York, NY, USA, 1992. ACM.

(Continued)

*Primary Examiner* — Thai Tran
*Assistant Examiner* — Nien-Ru Yang
(74) *Attorney, Agent, or Firm* — Procopio, Cory, Hargreaves & Savitch LLP

(57) ABSTRACT

Systems and methods of performing a process are provided, including receiving a live document video stream of a remote collaboration session, detecting a cursor action in the live document video stream, classifying the detected cursor action into an action category, detecting key frames of the live document video stream, indexing the detected key frames based on the action category, detecting a keyword in the indexed key frames, indexing the key frames using the category, visualizing the cursor action in the key frames based on the action category, and displaying the visualized cursor action.

20 Claims, 10 Drawing Sheets
(8 of 10 Drawing Sheet(s) Filed in Color)

(56) References Cited

OTHER PUBLICATIONS

Huang, R. W. White, and S. Dumais. No clicks, no problem: Using cursor movements to understand and improve search. In Proceedings of the SIGCHI Conference on Human Factors in Computing Systems, CHI '11, pp. 1225-1234, New York, NY, USA, 2011. ACM.

Weinmann, C. Schneider, and S. Robra-Bissantz. Mouserec—monitoring online users' emotions by recording and evaluating cursor movements. 2011.

Woodruff, A. Faulring, R. Rosenholtz, J. Morrsion, and P. Pirolli. Using thumbnails to search the web. In Proceedings of the SIGCHI Conference on Human Factors in Computing Systems, CHI '01, pp. 198-205, New York, NY, USA, 2001. ACM.

Yang, M. Siebert, P. Luhne, H. Sack, and C. Meinel. Lecture video indexing and analysis using video ocr technology. In Signal-Image Technology and Internet-Based Systems (SITIS), 2011 Seventh International Conference on, pp. 54-61, Nov. 2011.

Denoue, L., Hilbert, D., Adcock, J., Billsus, D., & Cooper, M. (2005). ProjectorBox: Seamless presentation capture for classrooms. In World Conference on E-Learning in Corporate, Government, Healthcare, and Higher Education (vol. 2005, No. 1, pp. 1986-1991).

\* cited by examiner

300

600

SYSTEMS AND METHODS FOR INTERACTION-BASED ANALYSIS AND VISUALIZATION OF REMOTE COLLABORATION SESSIONS

BACKGROUND

Field

Systems and methods are provided that relate to detecting and visualizing user interactions during remote collaborative meetings, and more specifically, to detecting, classifying and indexing user interactions in a live document stream for live searching and visualization of interaction-based meeting content.

Related Art

Online users that are remote with respect to one another may collaborate with one another remotely, in a collaborative environment using a web-based tool, such as WebRTC browser-based systems. WebRTC (Web Real-Time Communication) is an application programming interface (API) definition drafted by the World Wide Web Consortium (W3C) that supports browser-to-browser applications for voice calling, video chat, and peer-to-peer (P2P) file sharing without the need of internal or external plugins.

For example, remote users may share their screens during online meetings that are live, so as to show websites, edit presentation slides, or edit text in code editors. During the online meeting, the remote users may refer to the previously shared content. Further, the previously shared content may be the subject of future discussion or review.

However, a shared screen may include a large volume of information. Thus, one related approach is to index each frame, or one or more key frames using optical character recognition (OCR), so as to permit retrieval via text entry.

An alternative approach is to automatically detect actions taken by remote users in the live streams of each of the users. This automatic detection can be obtained via text editing and/or cursor (e.g., mouse cursor) motion. The output of the automatic detection includes screen-sharing videos (live or recorded).

One or more of the users may wish to retrieve the screen-sharing videos, either live or after the meeting. Because the screen-sharing videos contain text, a text-based search approach is one manner of providing the user with a retrieval mechanism.

However, such a related art approach may have various problems and disadvantages. For example, but not by way of limitation, the large amount of data in a frame (e.g., 30 "pages" per second) makes it impossible to provide real-time retrieval.

Related art application of users' actions to improve document skimming and retrieval includes video indexing that uses motion found in videos to segment the video into clips based on topics, allowing users to more easily browse clips or retrieve objects (e.g., "show me videos containing a cat"). This related art is directed to videos such as television footage or casual user-generated videos. However, this related art does not include extracting motion from screen sharing sessions for use in retrieval and presentation.

On web pages, related art mouse and keyboard tracking is used to monitor user's actions in order to design better web sites, detect when a search query was useful or not, or infer the emotional state of the user. However, unlike video documents, the related art Javascript code can be injected into web pages to collect mouse and keyboard actions. Accordingly, the related art does not include indexing of the pages being interacted with.

Additionally, related art personal bookmarks may be represented as an enhanced web page thumbnail, where keywords searched for are overlaid. However, this related art does not disclose how to extract mouse and text actions, and only uses color and text size to generate the enhanced thumbnails; moreover, the thumbnails are static.

Therefore, it may be desirable to develop systems and methods which may improve the ability to view relevant shared content during a remote collaboration meeting.

SUMMARY

Example implementations described herein provide systems and methods for live detection, classification, and indexing (e.g., processing) of user interactions during a remote collaboration session via an image-based key frame analysis of a live document stream. Once an interaction is detected, it is classified into an interaction category such as cursor movement, text selection or text editing, after which the classified interaction is used to index key frames of the live document stream for searching. Indexed key frames are then visually enhanced to illustrate the interaction which occurred to provide a clear understanding of the interaction during a real-time or subsequent playback of the interactions. The system also aggregates interactions of multiple users, utilizes thresholds to eliminate irrelevant interactions, weights key frames for targeted searching and detects images and audio for additional context.

In one example implementation, a method of performing a process comprises receiving a live document video stream of a remote collaboration session, detecting a cursor action in the live document video stream, classifying the detected cursor action into an action category, detecting key frames of the live document video stream, indexing the detected key frames based on the action category, detecting a keyword in the indexed key frames, indexing the key frames using the category, visualizing the cursor action in the key frames based on the action category, and displaying the visualized cursor action.

In another example implementation, a system for detecting, classifying and visualizing user interactions in a remote collaboration session comprises a receiving unit which receives a live document video stream of a remote collaboration session, a detection unit which detects a cursor action in the live document video stream, a classifying unit which classifies the detected cursor action into an action category, an indexing unit which detects key frames of the live document video stream and indexes the detected key frames based on the action category, and detects a keyword in the indexed key frames and indexes the key frames using the category, a visualizing unit which visualizes the cursor action in the key frames based on the action category, and a display unit which displays the visualized cursor action.

In yet another example implementation, a non-transitory computer readable medium is provided, storing instructions for executing a process, the instructions including detecting, from a recording of a live video stream, one or more cursor actions on displayed text, classifying the detected one or more cursor actions into an interaction category, and generating one or more keywords associated with the text, detecting the one or more keywords within the key frames of the live video stream, and indexing the key frames based on the interaction category, and storing an index entry of a temporal location of at least one frame of the recording with the generated one or more keywords in an index.

Other features and advantages of the present inventive concept will become more readily apparent to those of ordinary skill in the art after reviewing the following detailed description and accompanying drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The structure and operation of the example implementations will be understood from a review of the following detailed description and the accompanying drawings in which like reference numerals refer to like parts and in which.

DETAILED DESCRIPTION

Figure 1:
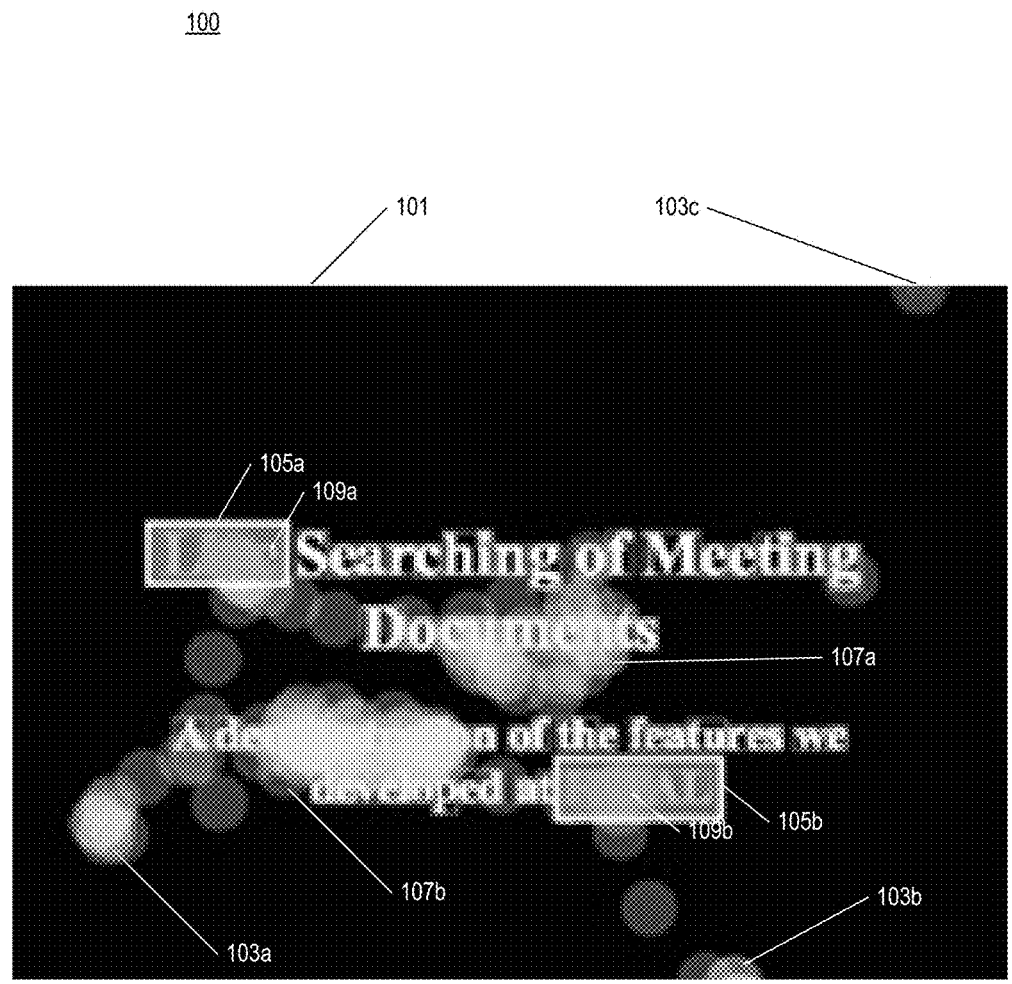
FIG. 1 illustrates an example trace of an online user's actions over a presentation slide being shared within a screen-sharing video from an online meeting, according to an example implementation.

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or operator control over certain aspects of the implementation, depending on the desired implementation of one of ordinary skill in the art practicing implementations of the present application. Further, although example implementations as described herein are described in context of an online conference between remote users that includes screen sharing, the example implementations are not limited thereto.

Examples implementations are directed to systems and methods for the detection of text changes and cursor motion, and the implementation thereof in a WebRTC-based system. Further, example implementations are directed to how users can search live documents during a meeting, based on the detected and indexed actions.

More specifically, example implementations relate to automatic detection of the actions that users take inside the live document streams, including, but not limited to, text editing and mouse cursor motion. The detection of text changes and cursor motion, and implementation thereof, may be provided in the WebRTC-based system, such that users may search live documents during an online meeting, based on the detected and indexed actions.

Although this description focuses on text editing, text selection and mouse cursor motion, additional types of user interaction may be detected and incorporated into the example implementations without departing from the inventive scope. For example, during observations of remote collaboration sessions, interactions which included mouse cursor motion, text selection, and text editing were found to provide significant context for a remote collaboration session.

The methods described herein are configured to be used for real time detection, classification and visualization of user interactions during a remote collaboration session. However, the systems and methods herein may be similarly applied to pre-recorded document video streams.

Some of the key concepts of the example implementations described herein include, but are not limited to:

1) automatically detecting cursor and text actions (e.g., text selection and text editing) in live or recorded video documents of shared screens (e.g., recordings of meetings, lectures, or webcasts);

2) the detected interactions are linked to words detected on key frames of the video document stream and these interactions are used to boost the importance of these words (e.g., term frequency) and retrieve important passages of the video documents;

3) mouse and text actions are used to visually present users with enhanced versions of the corresponding key frames, where visualized enhancement can be static (e.g., overlaying rectangles for selected words and overlaying mouse traces for mouse paths) or dynamic (e.g., an animation showing a synthetic rendering of text selections and mouse paths overlaid on top of the key-frame and conveying the timely actions as they happened without requiring replay of the actual video segment); and 4) enhanced key frames can be cropped, zoomed, or otherwise modified to emphasize regions of motion and present users with more targeted areas of interest (e.g., allowing the querying user to only see prescribed regions that may be of greater relevance of the viewing user, such as a graph or figure where the mouse moved).

For example, FIG. 1 provides an illustration 100 of a trace of a user's actions over a presentation slide 101 being shared within a short video clip from an online meeting. The action of the mouse is shown in dots (e.g., 103a, 103b, 103c . . . ), and the text selections are shown with rectangles (e.g., 105a, 105b).

With respect to FIG. 1, during the online meeting, the users were discussing the presentation slide 101, and one of the users marked (e.g., circled), using a mouse, two words on the presentation slide, "documents" 107a and "demonstration" 107b, and selected the text of two words in the slide, "live" 109a and "FXPAL" 109b. While the foregoing actions are provided as examples, the present example implementation is not limited thereto, and other actions that may be taken in a computing environment may be substituted therefor without departing from the inventive scope of the present application.

During or after the meeting, a user (e.g., a user other than the user that performed the circling action and/or the selecting action described above) may use the WebRTC system to perform a query or search on the term "FXPAL" or the term "live". The user may desire to see these key frames, instead of meetings or key frames where neither keyword was acted on. The user will then see the cursor interactions 103a, 103b, 103c in some form of visual representation (e.g., colored shading and/or patterning in FIG. 1) around any text or other areas of the slide (including pictures, videos or any type of content). Similarly, the text selection interactions 105a, 105b may be depicted visually in another form (e.g., colored, shaded box in FIG. 1) around the text which was interacted with during the session.

Within an online meeting, the same content will typically be shown multiple times. However, the content may be discussed in different contexts, or across different online meetings having similar content. For example, a group of users having an online meeting may prepare an online presentation slide or coding as pair-programming, such that the "same" words appear to be shown, although they are used in different context, and for different purposes.

In such circumstances as the foregoing, detected mouse-based interaction may provide context that allows an online user to better understand (e.g., disambiguate) the specific setting in which the same slide might have been discussed. As a result, content indexing and retrieval for a querying user may be improved.

Interaction Detection and Classification

According to the example implementation, automatic detection and indexing of the above-explained actions is performed from live (e.g., real-time) or recorded video documents, to enhance retrieval and presentation of search results. One part of the system is related to detection and classification of actions into categories (e.g., interaction detection). For example but not by way of limitation, the categories of actions may include mouse motion, text selection and text editing.

Figure 2A:
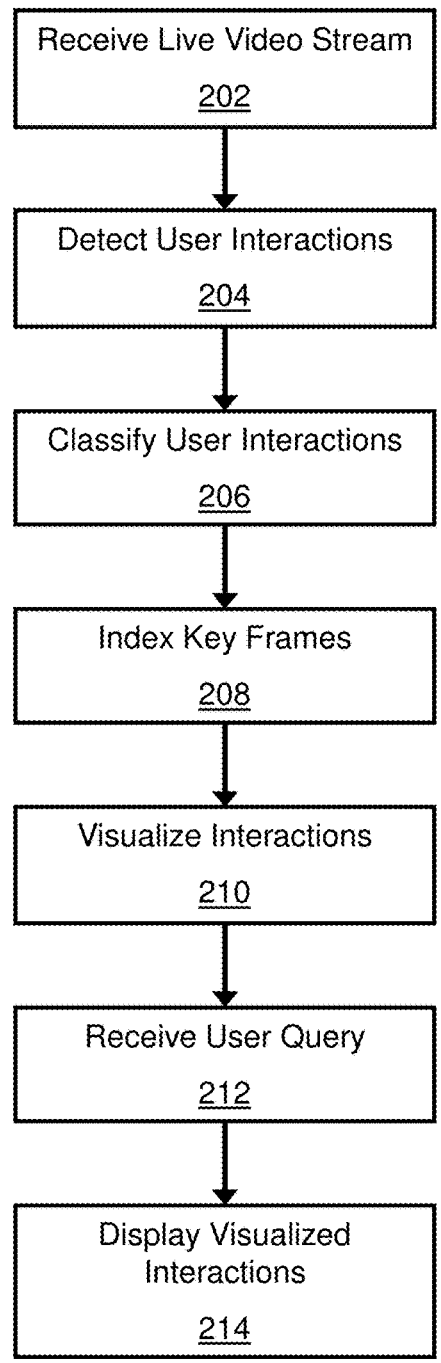
FIG. 2(a) is a block diagram of a method of detecting, classifying and searching live user interactions according to an example implementation.

FIG. 2(a) is a block diagram illustrating one example implementation of a method of detecting, classifying and visualizing user interactions in a remote collaboration session. In a first operation 202, a live video stream of a remote collaboration session is received. For example, a plurality of remote users may be haring screens, video, audio or other content input with one another, and the live video stream for each of the remote users is received.

Further, one or more user interactions are detected in operation 204. For example, the user interaction may involve a remote user performing an action (e.g., motion) via a user input device.

In operation 206, the detected user interactions are classified into an interaction category such as a text selection, text edit or cursor movement. As explained below, the user interaction may be determined to have a type or categorization based on the manner of input.

In operation 208, key frames pertaining to the user interactions are indexed, and the categorized interactions are then visualized in operation 210. Systems and method of indexing are discussed in greater detail below.

When a user makes a query to review a certain type of interaction in operation 212 (e.g., query with regard to previously discussed or shared content), the visualized interaction pertaining to the query is displayed to the user in operation 214, in real-time.

Figure 2B:
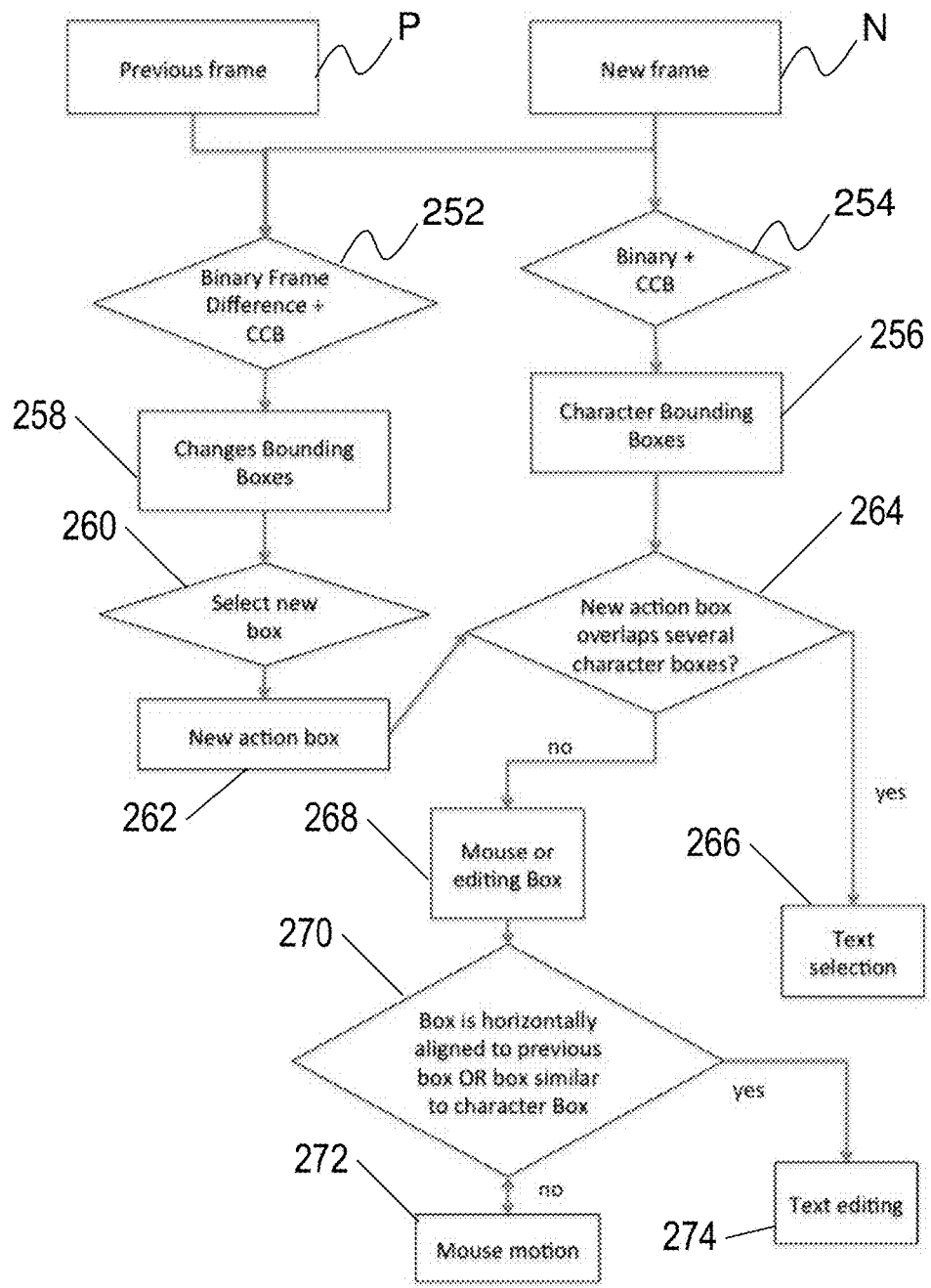
FIG. 2(b) illustrates a process according to an example implementation.

FIG. 2(b) is a flowchart which illustrates a process 200 for how interactions are detected. First, the binary of frame difference between a previous frame (P) and next frame (N) is computed at operation 252. For each pixel (x,y), the absolute difference D is computed between the luminance value of pixels P(x,y) and N(x,y). This absolute value is thresholded by T=32, yielding a binary frame D where differences appear as 255 and no change as 0.

The above values, and other values discussed here, are provided as examples only, and are not intended to be limiting. Other values may be substituted therefor as would be understood by those skilled in the art, without departing from the present inventive scope.

As explained above, the connected components boxes (CCB) of this difference D between the two successive frames, P and N, at operation 252. Further, CCB(D), which is the connected components of the binarized version of the new frame N, is calculated at 254 for the new frame N. The CCB of the new frame N (e.g., CCB(N)) involves the connected components of the binarized version of the new frame N. This set of connected components is used to detect the location of text areas on the new frame, and are subsequently used in operation 264, to determine whether the new action box overlaps with several character boxes.

At operation 258, the bounding box(es) of the previous frame P is(are) changed based on the results of operation 252. At operation 260 a new box is selected, and a new action box is generated.

Similarly, at operation 256, the bounding boxes of the new frame N are generated based on the results of operation 254. Typically, zero boxes are found when no change happened (e.g. the mouse cursor doesn't move); one box when, for example, the mouse cursor moved a little bit but not far enough to be distinguished from the previous position); or two boxes.

In operation 264, it is determined whether the new action box of operation 262 overlaps several character boxes as bounded in operation 256. If the result is "yes" (e.g., there is overlap), it is determined by operation 266 that the action was a text selection. If the result is "no" (e.g., there is no overlap), it is determined at operation 268 that the box is a mouse or editing box. At operation 270, it further determined whether the box is horizontally aligned to the previous box, or whether the box is similar to the character box. If the result is "yes", then it is determined at operation 274 that the action is text editing. If the result is "no", it is determined at operation 272 that the action is a mouse motion.

The foregoing example process of FIG. 2(b) not intended to be limiting, and other processes may be substituted therefor as would be known by those skilled in the art without departing from the inventive scope. For example, but not by way of limitation, other criteria may be used in operations 264 and/or 270 to make the necessary determinations. Additionally, operations may be removed, added or rearranged within the inventive scope of the example implementations.

Figure 3:
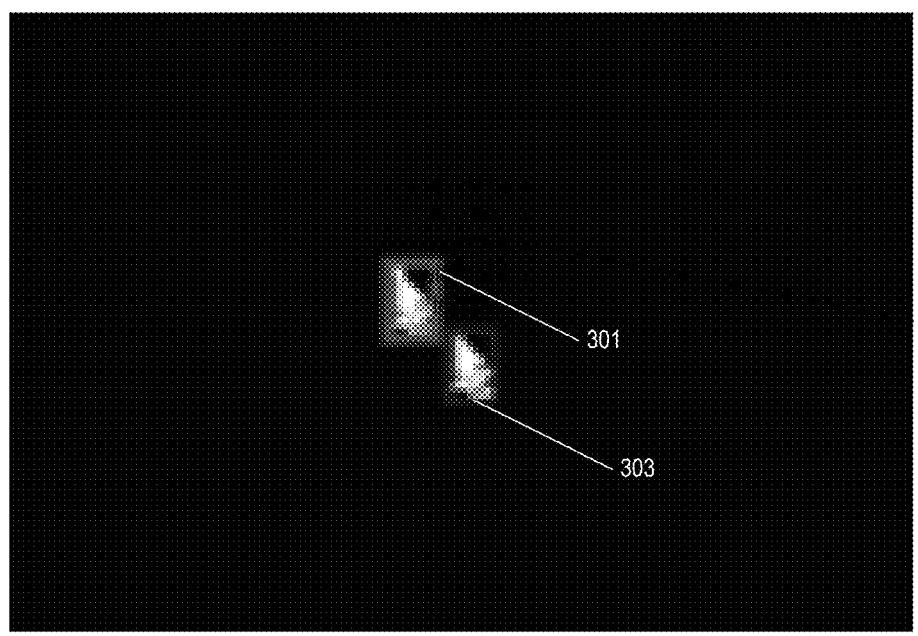
FIG. 3 is an image showing a detection of movement of a mouse cursor between frames of a video, according to an example implementation.

FIG. 3 illustrates an example 300 of two boxes being found. The cursor has moved from position 301 (in blue) to position 303 (in red). When the cursor moves, the binary version of the frame difference contains two connected components: the new position 303 (red) is selected as the box most different from the previous mouse position 301 (blue).

Depending on the number of boxes, a new motion box is detected (to be used later to classify the action as mouse motion, text selection or text editing) such that if no box is found, the old detected action is used as the new motion box. If one box is found, it is selected as the new motion box. If two boxes are found, the new motion box is selected as the box that is most different from the previous motion box because the other box represents the old mouse position.

As noted above, depending on the number of boxes, a new motion box may be detected. The new motion box may be used to classify a type of the action, such as mouse motion, text selection or text editing, but not limited thereto.

In the circumstance that no box is determined (e.g., no change in position), the previous (e.g., old) detected action is used as the new motion box. If one box is determined, the box is selected as the new motion box. If two boxes are determined, the new motion box is selected as the box that is most different from the previous motion box, as the other box represents the previous position (e.g., old mouse position).

In addition to the above-described computation of D and CCB, the binary version of the new frame N is computed as well, along with its connected component boxes, CCB(N).

Figure 4A:
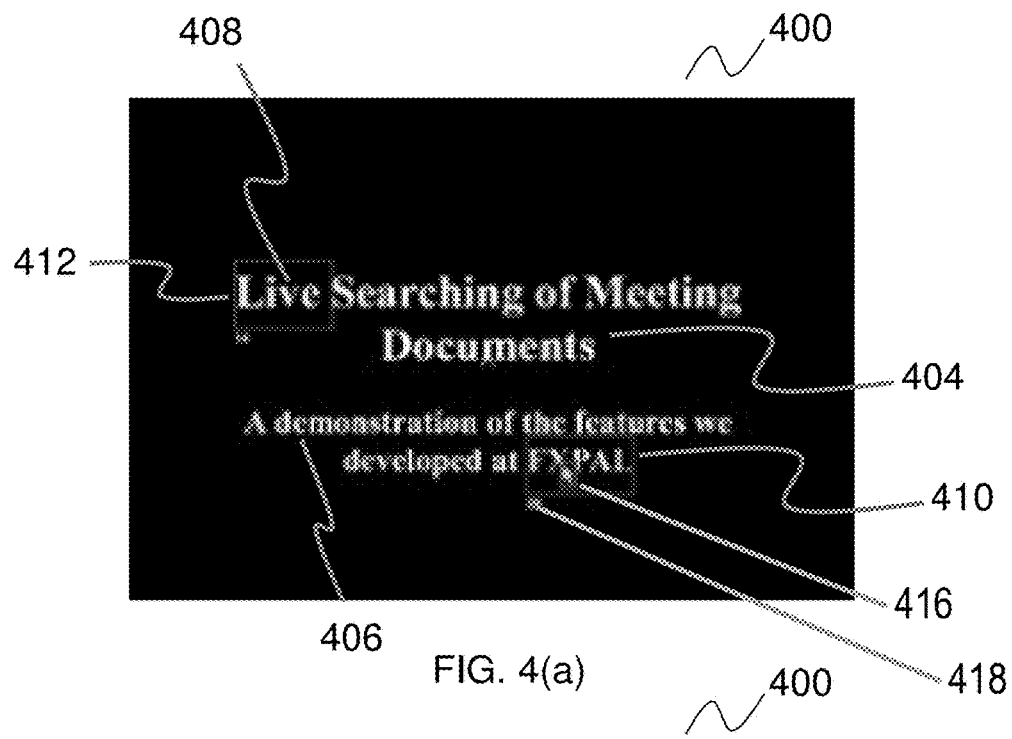
FIG. 4(a) is an image of a presentation slide showing a detection of text selection by the user, according to one example implementation.
Figure 4B:
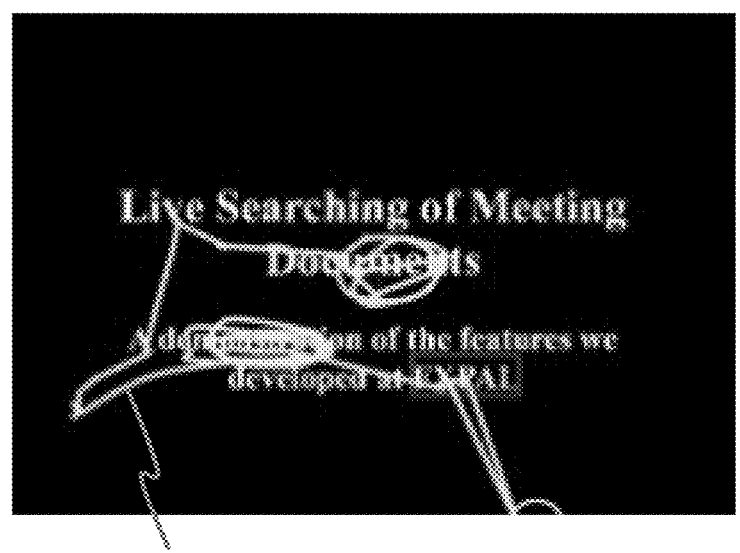
FIG. 4(b) is an image of a presentation slide showing a detection of mouse cursor movement by the user, according to one example implementation.

FIGS. 4(a) and 4(b) illustrate classification results 400 on the sample video document where the words "Live" 408 and "FXPAL" 416 were selected by the user as indicated at 410, 412, and the words "Documents" 404 and "demonstration" 406 were marked (e.g., circled over) as indicated by the trace at 414, as discussed above. Element 418 is a number on the bottom left corner of the rectangle 410; element 418 provides a number of frames where this rectangle 410 was detected as "text selection". The result is incorporated in the indexing operation, as explained below.

To classify new motion boxes into actions (e.g., mouse, text selection, text editing), the intersection of the new motion boxes with the connected components of the new frame N, CCN(N) is calculated. If the action box substantially overlaps a prescribed number (e.g., 3) or more boxes from CCN(N), the motion box is classified as a "text selection", as shown in FIGS. 4(a) and 4(b) at 401. On the other hand, if the motion box is translated horizontally from the previous action box, it is classified as a "text editing", and the previous motion box is also classified as "text editing". In neither of the above is true, the motion box is labeled as "mouse motion", as shown in FIG. 4 at 414.

In one example implementation, the system may be configured to capture user interactions from a plurality of users who are jointly collaborating and interacting in the live document video stream. For example, if all users in the remote collaboration session have editing capabilities and their own cursors, the system may capture all of this movement and text editing and either reflect each user's interactions individually or aggregate their interactions together to emphasize which areas of a key frame were being jointly discussed. For representing individual interactions amongst many users, different colors, shades, line thickness, etc. may be used to differentiate between the interactions of different users.

In a further example implementation, the system may be configured to capture audio from one or more users during the collaboration session and incorporate the words being spoken by the users into visual enhancements of the relevant content in the video stream. The system may generally capture words from any user and aggregate this information into enhanced visualizations, or the system may be configured to individually detect each user by voice or source of audio in order to individually highlight each user's interactions based on the audio feed associated with the user. A central server (such as the Interaction Server described below) may be utilized as a time synchronization server to synchronize audio, video and other time-based elements of the video feed.

Key Frame Indexing

According to another aspect of the example implementation, the actions detected as disclosed above may be used to index the video document (e.g., key frame indexing). At least two indexing example processes (e.g., algorithmic approaches) are provided, as explained below.

According to a first example indexing process (e.g., first algorithmic approach), the only the raw pixel differences are tracked. As an alternate implementation, the connected component boxes of the raw pixel differences may be tracked, which may reduce the required memory utilization. When the optical character recognition (OCR) engine is applied to recognized words in the key frame, each of the recognized words may be weighted with an amount of the change that has been detected.

For example, but not by way of limitation, the term frequency of the word is increased for every frame that has a moved pixel under the word bounding-box. Without further classifying the motion into classes (e.g., mouse, text selection, text editing), this process may add the signal to the index, and may rank the key-frames higher when searching inside the same online meeting, or when ranking several online meetings among one other.

According to a second example indexing process (e.g., second algorithmic process), actions are categorized as, for example but not by way of limitation, mouse motion, text selection, or editing. These higher-level categories are used to weight words detected by the OCR engine. The weighting may be performed according to one or more schemes. For example, but not by way of limitation, additional weights may be added to text actions as compared with mouse motions. These categories may also be applied as search filters instead of weights. Further, a user may retrieve only moments in video documents in which a text was edited, as opposed to retrieving moments in video documents in which the text was pointed at or focused on by the cursor (e.g., mouse pointer).

Based on the foregoing example processes, weights may be given to frames. Without the weights that are indicative of addition motion signals or actions, it would not be possible to distinguish frames from each other.

In the foregoing algorithmic processes, the weights that are assigned to the keywords may be determined by one or more processed. For example, by not by way of limitation, one weight determination process may involve counting the number of pixels that are different over a given keyword (e.g., counting the white pixels obtained in operation 252 that overlap a given word bounding box obtained in operation 256). Another weight determination process may involve using the higher-level actions (e.g., mouse or text actions) determined in operation 266 for text selection, operation 272 for mouse motion, and operation 274 for text editing. Further, as noted above with respect to the second example indexing process, the user is provided with finer control of the search results (e.g., the user can be shown only the frames where the text has been edited), as opposed to in the case of the first example indexing process, which would show the user all of the frames where an action has occurred, without providing information on the kind of action.

While the key frame discussed in the foregoing example implementations us directed to text, the present subject matter is not limited thereto. For example, but not by way of limitation, the key frame may instead contain non-text content (e.g., graphic information, such as plots or charts), or natural image content (e.g., photographs).

In such non-text implementations, the search interface also provides a user with a manner of filtering the key frames according to the detected interaction. Further, for the interaction region not including any text, if there is text elsewhere in the key frame, that text may be boosted according to the detected interaction, as it is understood that text in the same key frame is implicitly related to its image content.

Additionally, the text-based query may include other alternate variations and disclosures. For example, but not by way of limitation, text that is detected in other key frames within a temporal window of an image-only (e.g., non-text) key frame may be used for indexing. Further, the weighting scheme may include a decay function that decays the image-only key frame to text terms over time. With regard to audio, spoken text in the meeting audio may be extracted by an automatic speech recognition program.

Further, in the case of OCR text, the weighting scheme may be based on the detected interaction. Further, pre-trained automatic image annotation tools may be employed to generate text descriptions of image content, which can be used to provide a confidence measure, which in turn can be integrated into the search index.

Visualization of Interactions

Figure 5:
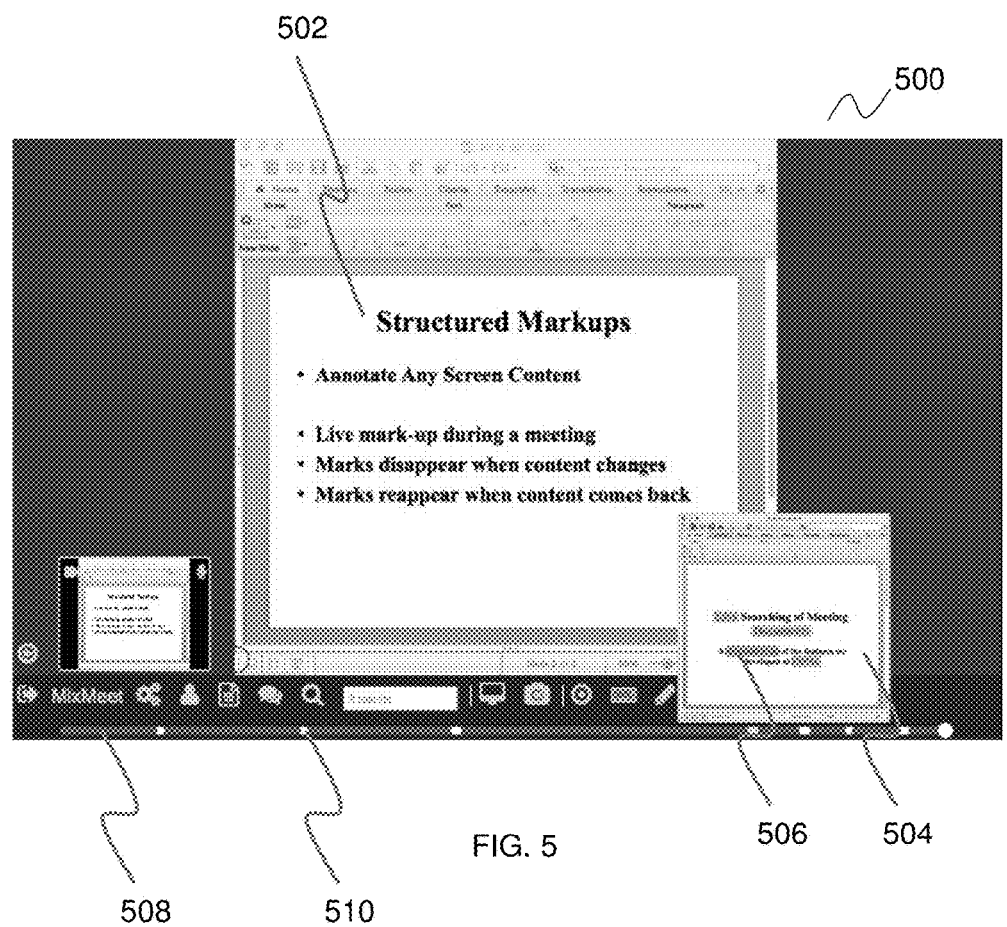
FIG. 5 is an image of a graphical user interface illustrating a frame of a live presentation and a thumbnail image depicting real time detected text selection and detected mouse cursor movement on the frame, according to one example implementation.

Another component of the system pertains to presenting the results to the user. FIG. 5 shows seven matching points in the timeline (e.g., bottom), based on user having used a mouse to click on one point. The matching key frame can be seen, with actions overlaid, as explained below. More specifically, FIG. 5 illustrates an interface according to an example implementation. A thumbnail is provided at the bottom right, with a frame matching the query "live". The key frame is enhanced with detected actions: two words were selected ("live" and "FXPAL") and two words where circled over by mouse pointer ("documents" and "demonstration").

As shown in FIG. 5, an image of one example implementation of a graphical user interface (GUI) 500 illustrates a frame 502 of a live presentation and a thumbnail image 504 depicting real time detected text selection 506 and detected mouse cursor movement on the frame 502. The thumbnail 504 with a frame matching a query, "live". Visual enhancements 506 pertaining to the user interactions are shown in the thumbnail 504 with detected actions: two words were selected ("live" and "FXPAL") and two words where circled over by mouse pointer ("documents" and "demonstration"), as also illustrated in FIG. 1.

A timeline 508 feature depicted on the bottom of the GUI shows several (e.g., seven) matching points 510 in the timeline where interactions were detected. If the user clicks on one point 510, a matching key frame with visually enhanced interactions overlaid will appear in the thumbnail image 504.

The example implementation of FIG. 5 may be provided in as a stand-alone online application. Alternatively, the example implementation may be integrated into an existing web browser or other online tool to access online content. Further, the example implementation may also be provided as an add-on or a plug-in for a third party online tool.

According to another example implementation, the results of a query may be provided to the user. FIGS. 6(*a*) and 6(*b*) illustrate detected actions, 600 and 650, respectively, overlaid over the key frame, as provided to the user requesting the query. For example, but not by way of limitation, the color transparency may encode an amount of motion that was detected over the corresponding words. FIG. 6(*a*) refers to words being colored without determining the type of action that occurred, whereas FIG. 6(*b*) refers to mouse circles versus text selections (e.g., including the type of action that occurred). It should be noted that the second example indexing process provides for coloring of the key frames according to this example implementation.

For example, but not by way of limitation, according to the first above-described indexing process (e.g., first algorithmic process), the retrieved key frames may be enhanced by overlaying detected motion using color (e.g., to tint the underlying words), as shown in FIG. 6(*a*). According to this process, the key frames may instead be enhanced with synthetic representations of mouse paths and text selections, as shown in FIG. 6(*b*). These statically enhanced key frames may permit users to skim matching key frames during a meeting, in a manner that may not be possible to capture in a printable document.

In one example implementation, detected actions may be overlaid over the key frame as indicated above, but may have color transparency differences which reflect an amount of motion that was detected over the corresponding words. For example, the cursor motion enhancements in FIG. 1 have low transparency, indicating a large amount of motion over the words.

According to an alternate implementation, animated key frames may be generated by synthetically replaying mouse paths and text actions over the key frame, thereby giving users a more granular view of actions associated with this key frame without replaying (or having recorded) the actual video. These animated key frames may be useful during a post-meeting query or retrieval task, because they may provide the user with additional context, including if a corresponding audio clip is provided to the user (e.g., played back). The motion path may be useful for the user, such that the user can be provided with information on comments by other users for not just text, but for non-text content such as a chart or figure, for example.

Further, as explained above, image-only key frames may be provided without text. In such example implementations, spatial grouping or image segmentation techniques can be applied to localize any detected interactions. Accordingly, and in a manner substantially similar to text based segmentation as described above, specific image regions can be emphasized for visualization by the user performing the query.

According to another example implementation, the key frame may be modified. For example, but not by way of limitation, instead of showing users entire key frames, only regions of the key frames may be provided to the user performing the query. This is accomplished by use of a cropping tool that permits cropping of the key frames to regions that have been detected to contain motion. The cropping is may be useful for actions found over regions of images (e.g., figures, graphs).

Based on the cropping, the retrieval engine retrieves key frames that match the user query, and shows only the cropped key frames, which may allow the user to focus on images of interest that contain the motion. As a result, the search based on detected activity may provide the user with a manner to retrieve such images without requiring the key frame as provided to the user performing the query to contain text.

Other extensions may be possible in specific domains in which the content includes specific objects or categories. For example, but not by way of limitation, simple classifiers that discriminate plot graphics from text slides, or other key frame categories, may be included so as to enhance key framing and indexing, and in turn, augment the faceted search interface. For this approach, the classification should execute in real-time on live streams on the client (e.g., browser), which may require pre-training the classifiers offline. Such an approach may enhance indexing and retrieval in specific contexts.

For the foregoing example implementation, tests were performed on five video clips, including one from an online meeting recording. The example implementation detected mouse paths, text selections and text edits. Enhanced key frames were generated to demonstrate how detected actions can be rendered over the original key frames. Thus, it could be shown that ranking key frames and showing the enhanced key frames may provide a user with the ability to rejoin into a meeting in-progress based on keyword search. Results of these tests are illustrated in FIGS. 1, 4(a), 4(b), 5, 6(a) and 6(b), for example. However, the present example implementations are not limited to these test results, and further test results may be obtained depending on various circumstances, as would be understood by those skilled in the art.

Figure 7:
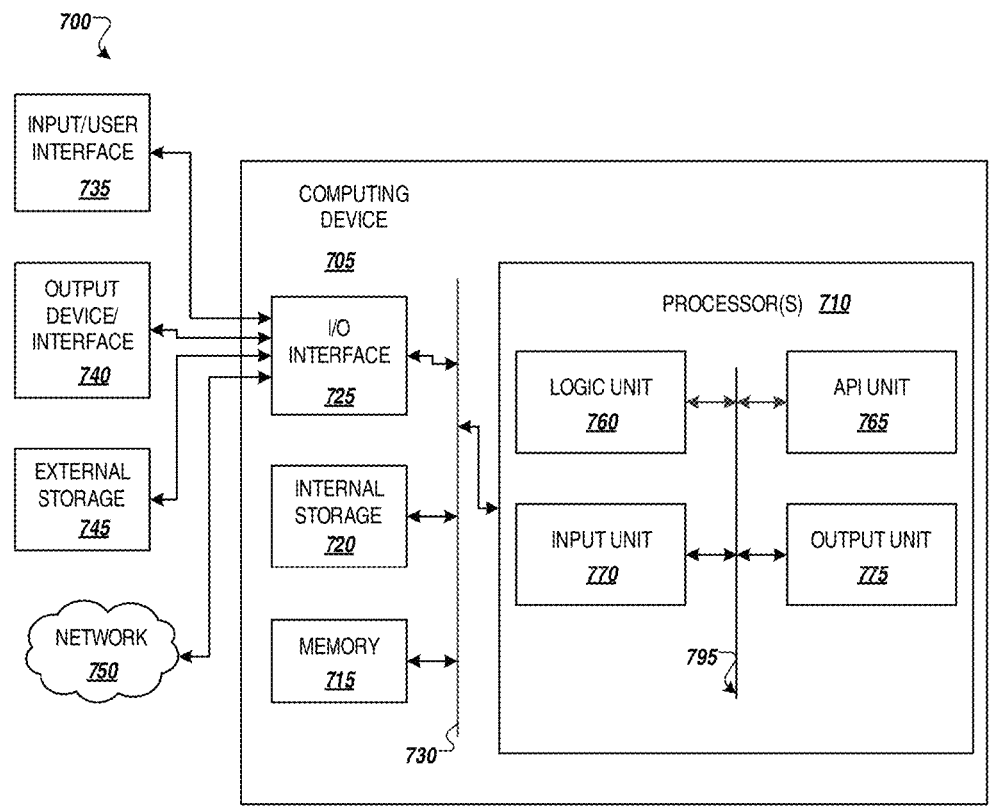
FIG. 7 illustrates an example computing environment with an example computer device suitable for use in some example implementations, such as an apparatus to facilitate the functionality of navigating another movable apparatus.

FIG. 7 illustrates an example computing environment with an example computer device suitable for use in some example implementations, such as an apparatus to facilitate the functionality of navigating another movable apparatus. Computer device 705 in computing environment 700 can include one or more processing units, cores, or processors 710, memory 715 (e.g., RAM, ROM, and/or the like), internal storage 720 (e.g., magnetic, optical, solid state storage, and/or organic), and/or I/O interface 725, any of which can be coupled on a communication mechanism or bus 730 for communicating information or embedded in the computer device 705.

Computer device 705 can be communicatively coupled to input/user interface 735 and output device/interface 740. Either one or both of input/user interface 735 and output device/interface 740 can be a wired or wireless interface and can be detachable. Input/user interface 735 may include any device, component, sensor, or interface, physical or virtual, that can be used to provide input (e.g., buttons, touch-screen interface, keyboard, a pointing/cursor control, microphone, camera, braille, motion sensor, optical reader, and/or the like).

Output device/interface 740 may include a display, television, monitor, printer, speaker, braille, or the like. In some example implementations, input/user interface 735 and output device/interface 740 can be embedded with or physically coupled to the computer device 705. In other example implementations, other computer devices may function as or provide the functions of input/user interface 735 and output device/interface 740 for a computer device 705.

Examples of computer device 705 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 705 can be communicatively coupled (e.g., via I/O interface 725) to external storage 745 and network 750 for communicating with any number of networked components, devices, and systems, including one or more computer devices of the same or different configuration. Computer device 705 or any connected computer device can be functioning as, providing services of, or referred to as a server, client, thin server, general machine, special-purpose machine, or another label.

I/O interface 725 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 700. Network 750 can be any network or combination of networks (e.g., the Internet, local area network, wide area network, a telephonic network, a cellular network, satellite network, and the like).

Computer device 705 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computer device 705 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 710 can execute under any operating system (OS) (not shown), in a native or virtual environment. One or more applications can be deployed that include logic unit 760, application programming interface (API) unit 765, input unit 770, output unit 775, and inter-unit communication mechanism 795 for the different units to communicate with each other, with the OS, and with other applications (not shown). The described units and elements can be varied in design, function, configuration, or implementation and are not limited to the descriptions provided.

In some example implementations, when information or an execution instruction is received by API unit 765, it may be communicated to one or more other units (e.g., logic unit 760, input unit 770, output unit 775). In some instances, logic unit 760 may be configured to control the information flow among the units and direct the services provided by API unit 765, input unit 770, output unit 775, in some example implementations described above. For example, the flow of one or more processes or implementations may be controlled by logic unit 760 alone or in conjunction with API unit 765. The input unit 770 may be configured to obtain input for the calculations described in the example implementations, and the output unit 775 may be configured to provide output based on the calculations described in example implementations.

Figure 6A:
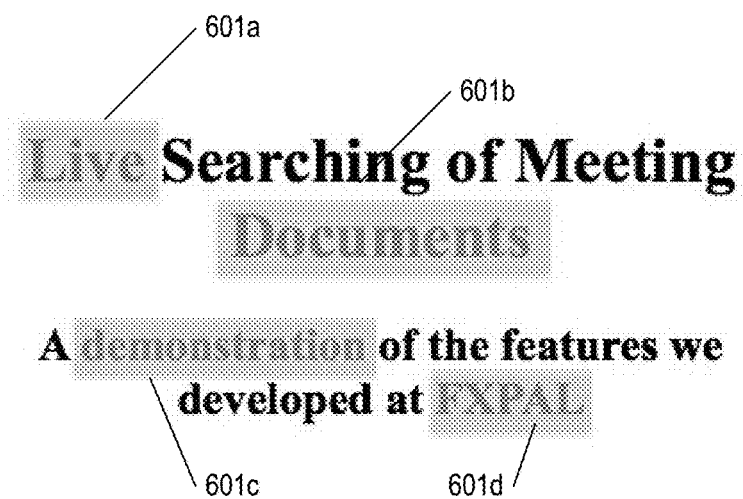
FIG. 6(a) is an image of a presentation slide showing a visual representation of detected motion as a text selection, according to one example implementation.
Figure 6B:
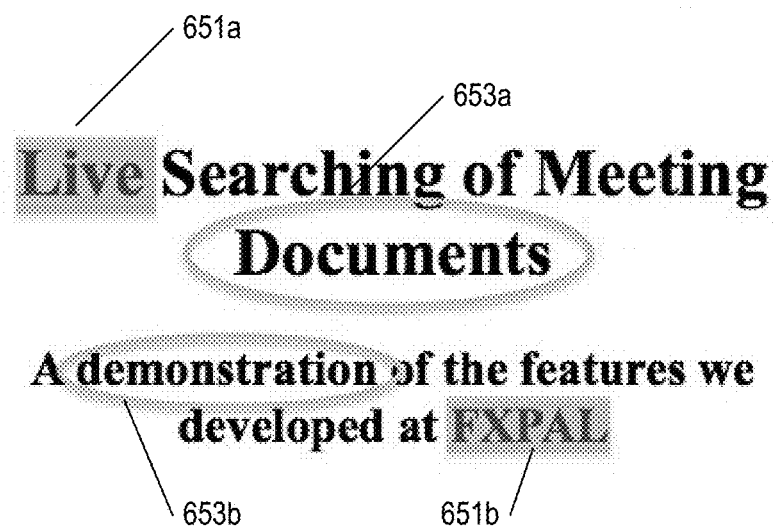
FIG. 6(b) is an image of a presentation slide showing a visual representation of detected mouse motion as a mouse path, according to one example implementation.

Processor(s) 710 can be configured to process a proposed navigation path for the movable apparatus, such as a robot, in accordance with the flow diagrams of FIGS. 6(a) and 6(b), to determine any portions of the proposed navigation path that intersect an obstacle identified from sensor data from the movable apparatus. Should such portions exist, processor(s) 710 can cause output device 740 to highlight such portions as well as display an alternate navigation path that also includes highlighting on portions of the alternate navigation path that differ from the proposed navigation path. Processor(s) 710 can also be configured to highlight portions of the proposed navigation path that are within a proximity threshold of the identified obstacle. The proximity threshold can be a factory setting of the movable apparatus, or can be set by the operator of the interface through input/user interface 735.

Processor(s) 710 can also be configured to cause the output device 740 to display the proposed navigation path overlaid on visual data from the movable apparatus. Processor(s) 710 is configured to utilize I/O interface 725 to transmit instructions to the movable apparatus to navigate the proposed navigation path at a first velocity, and to navigate the highlighted portions of the proposed navigation path at a second velocity different from the first velocity. The velocities can be slower for the highlighted portions due to proximity of obstacles. These velocities can be a factory setting of the movable apparatus or can be set by the operator of the interface through input/user interface 735.

Processor(s) 710 can also be configured to apply highlighting to portions of the proposed navigation path that intersect the identified obstacle as well as the identified obstacle itself. For further identification of obstacles, the processor(s) 710 can also be configured to retrieve one or more overlays to overlay on visual data from the movable apparatus, based on a location of the movable apparatus and the identified obstacle. Location information, such as information related to the location of the movable apparatus within a building, can be applied to identify obstacles as particular objects (e.g., pillar, wall, chair, etc.) and can also be used to place overlays to guide the operator to a desired room or location.

Figure 8:
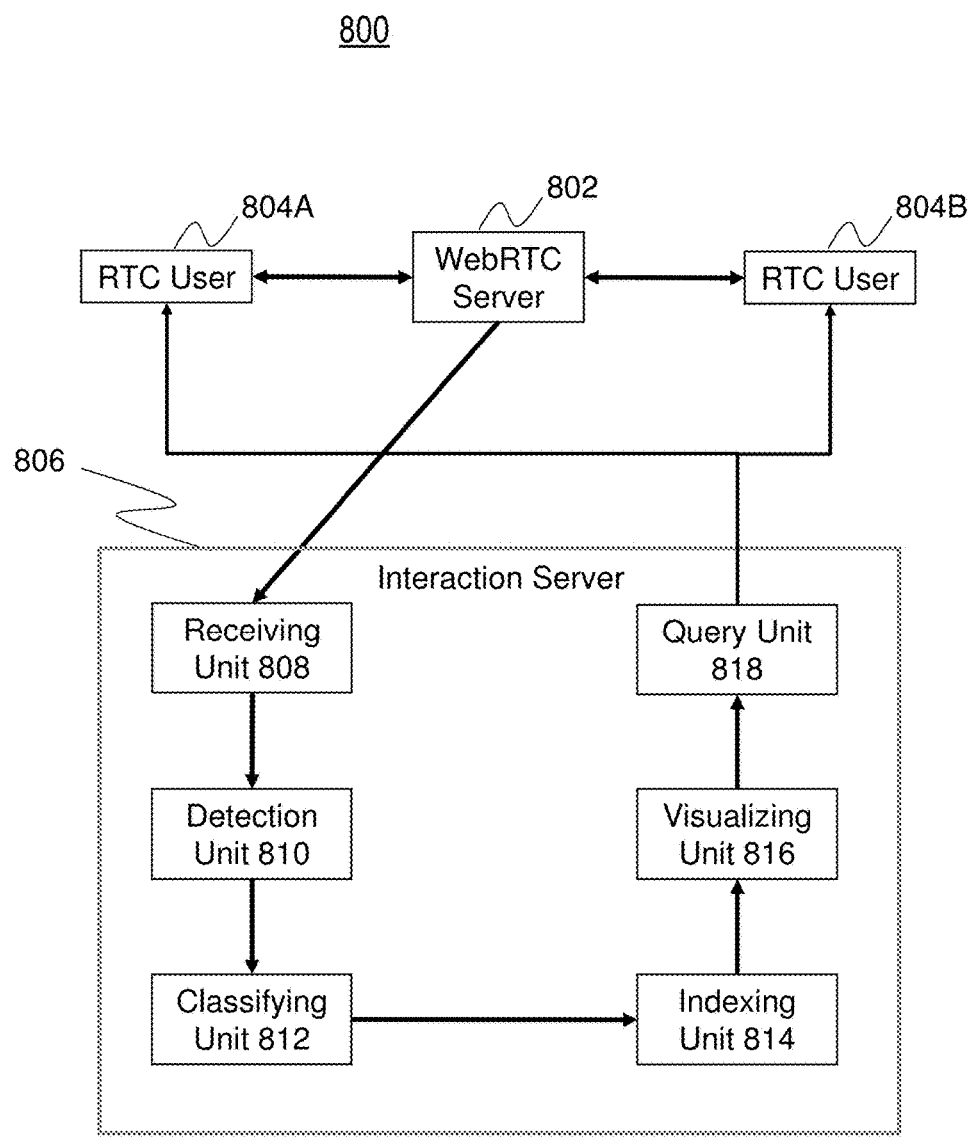
FIG. 8 is a block diagram of a system of detecting user interactions according to an example implementation.

FIG. 8 is a block diagram 800 illustrating one example implementation of a system for detecting, classifying and visualizing user interactions in a remote collaboration session. A remote collaboration session such as a WebRTC browser-based session may take place across a WebRTC Server 802 between at least two users running computing devices, in this case RTC User 804A and RTC User 804B. An Interaction Server 806 receives a live document video stream from the WebRTC Server 802 at a Receiving Unit 808.

The video stream is then passed to a Detection Unit 810 to detect one or more user interactions, after which the detected user interactions are sent to a Classifying Unit 812 to determine the interaction category of each of the user interactions. A Indexing Unit 814 will then index the key frames pertaining to the user interactions, and a Visualizing Unit 816 will then create a visualized representation of the user interactions, which can then be transmitted via the Query Unit 818 which will receive a user's query, retrieve the corresponding results and transmit the results to either of the RTC Users 804A or 804B.

In one example implementation, the detection, classification and other analysis may be completed at the client side on the machine (e.g., RTC User 804A and/or 804B). However, one or more of these operations may also be performed at the Interaction Server 806, or the operations may be performed in part by both.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined operations leading to a desired end state or result. In example implementations, the operations carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium.

A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method operations. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application.

Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

The example implementations may have various differences and advantages over related art. For example, but not by way of limitation, as opposed to instrumenting web pages with Javascript as explained above with respect to the related art, text and mouse actions may be detected and analyzed in video documents.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A method of performing a computer process, comprising:
   receiving a live document video stream of a remote collaboration session;
   detecting a cursor action in the live document video stream;
   classifying the detected cursor action into an action category;
   detecting key frames of the live document video stream;
   indexing the detected key frames based on the action category;
   detecting a keyword in the indexed key frames;
   indexing the key frames using the category;
   visualizing the cursor action in the key frames based on the action category; and
   displaying the visualized cursor action.

2. The method of claim 1, wherein the displaying the visualized cursor action is performed in real-time.

3. The method of claim 1, wherein the indexing the key frames using the category further comprises indexing the key frames using the category to weight the detected keyword.

4. The method of claim 1, wherein the action category includes at least one of a text selection movement, a text editing movement and a cursor movement.

5. The method of claim 1, wherein the action category is selected based on a type of movement detected, and the type of movement is determined based on a connected components box analysis of a frame difference computed between the previous frame and the next frame.

6. The method of claim 1, further comprising indexing the key frames based on one or more raw pixel differences between the previous frame and the next frame.

7. The method of claim 1, further comprising indexing the key frames by categorizing the cursor action into the action category and weighting words in the key frames based on their corresponding action category.

8. The method of claim 1, further comprising visualizing the cursor action by overlaying color or shading on an area of the key frames where the cursor action occurred.

9. The method of claim 1, further comprising visualizing the cursor action by animating a representation of the cursor action on an area of the key frames where the cursor action occurred.

10. A system for detecting, classifying and visualizing user interactions in a remote collaboration session, the system comprising:
    a receiver which receives a live document video stream of a remote collaboration session;
    a detector which detects a cursor action in the live document video stream;
    a classifier which classifies the detected cursor action into an action category;
    an indexer which detects key frames of the live document video stream and indexes the detected key frames based on the action category, and detects a keyword in the indexed key frames and indexes the key frames using the category;
    a visualizer which visualizes the cursor action in the key frames based on the action category; and
    a display which displays the visualized cursor action.

11. The system of claim 10, wherein the displaying the visualized cursor action is performed in real-time.

12. The system of claim 10, wherein the indexing the key frames using the category further comprises indexing the key frames using the category to weight the detected keyword.

13. The system of claim 10, wherein the detector detects the one or more user interactions by detecting movement between a previous frame and a next frame in the live document video stream.

14. A non-transitory computer readable medium, storing instructions for executing a process, the instructions comprising:
    detecting, from a recording of a live video stream, one or more cursor actions on displayed text;
    classifying the detected one or more cursor actions into an interaction category, and generating one or more keywords associated with the text;
    detecting the one or more keywords within the key frames of the live video stream, and indexing the key frames based on the interaction category; and
    storing an index entry of a temporal location of at least one frame of the recording with the generated one or more keywords in an index.

15. The non-transitory computer readable medium of claim 14, wherein the detecting is performed so as to weight the detected one or more keywords.

16. The non-transitory computer readable medium of claim 14, wherein the instructions further comprise:
    from the detecting of the one or more cursor actions on the displayed text, determining a type of the one or more cursor actions;
    for the type of the one or more cursor actions being a text selection type, highlighting the text;
    for the type of the one or more cursor actions being a text editing type, highlighting edited text; and
    for the one or more cursor actions being a mouse cursor action, highlighting a path of the mouse cursor action.

17. The non-transitory computer readable medium of claim 14, wherein the instructions further comprise, for the one or more cursor actions being the mouse cursor action, cropping the at least one frame based on the path of the mouse cursor action.

18. The non-transitory computer readable medium of claim 14, wherein the temporal location is determined based on a term frequency of the generated one or more keywords, and wherein the detecting the one or more cursor actions from the recording is conducted during the recording.

19. The non-transitory computer readable medium of claim 14, wherein the instructions further comprise:
    detecting, from audio of the recording, one or more words of the text detected from the displayed text;
    from the detecting of the one or more cursor actions of the text detected from the displayed text, generating the one or more keywords associated with the text.

20. The non-transitory computer readable medium of claim 14, wherein the instructions further comprise:
    in response to a keyword query, retrieving, from the index, the index entry having the one or more keywords associated with the keyword query; and returning the temporal location of the one or more frames associated with the index entry.

\* \* \* \* \*